United States Patent
Haible et al.

(10) Patent No.: US 11,987,222 B2
(45) Date of Patent: May 21, 2024

(54) METHOD AND CONTROL UNIT FOR OPERATING A HYDRAULIC BRAKING SYSTEM, BRAKING SYSTEM, AND MOTOR VEHICLE

(71) Applicant: Robert Bosch GmbH, Stuttgart (DE)

(72) Inventors: Timo Haible, Backnang (DE); Anatoly Malkin, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 715 days.

(21) Appl. No.: 17/431,684

(22) PCT Filed: Jul. 11, 2019

(86) PCT No.: PCT/EP2019/068746
§ 371 (c)(1),
(2) Date: Oct. 5, 2021

(87) PCT Pub. No.: WO2020/030376
PCT Pub. Date: Feb. 13, 2020

(65) Prior Publication Data
US 2022/0135015 A1    May 5, 2022

(30) Foreign Application Priority Data
Aug. 8, 2018 (DE) .......................... 102018213330.1

(51) Int. Cl.
*B60T 17/22* (2006.01)
*B60Q 9/00* (2006.01)
(Continued)

(52) U.S. Cl.
CPC .............. *B60T 17/221* (2013.01); *B60Q 9/00* (2013.01); *B60T 8/326* (2013.01); *B60T 13/745* (2013.01); *B60T 2270/413* (2013.01)

(58) Field of Classification Search
CPC ............. B60T 17/221; B60T 2270/413; B60T 13/745; B60T 8/326; B60T 8/885; B60T 8/94; B60Q 9/00
See application file for complete search history.

(56) References Cited

U.S. PATENT DOCUMENTS 10,919,512 B2 *  2/2021  Foitzik ................. B60T 13/662
2018/0297574 A1 * 10/2018  Zimmermann ....... B60T 8/4081
(Continued)

FOREIGN PATENT DOCUMENTS

EP      2671769 A1    12/2013
WO   2017063809 A1    4/2017

OTHER PUBLICATIONS

German Patent No. DE 102018212848 to Henning published on Feb. 6, 2020.*

(Continued)

*Primary Examiner* — Pamela Rodriguez
(74) *Attorney, Agent, or Firm* — NORTON ROSE FULBRIGHT US LLP; Gerard A. Messina

(57) ABSTRACT

A method for operating a hydraulic braking system, which includes at least one actuatable actuator for generating a hydraulic brake pressure using brake fluid. A first leakage loss of the brake fluid in the braking system is ascertained as a function of a volume of a pressure chamber of the actuator at a starting pressure at the beginning of a braking process and the volume of the pressure chamber when the starting pressure is reached at the conclusion of the braking process. A second leakage loss of the braking fluid is continuously calculated while the braking process is carried out. The first leakage loss is compared to the second leakage loss for the plausibility check after a braking process was carried out.

9 Claims, 2 Drawing Sheets

(51) Int. Cl.
B60T 8/32 (2006.01)
B60T 13/74 (2006.01)

(56) References Cited

U.S. PATENT DOCUMENTS

2019/0184958 A1* 6/2019 Watanabe ................. B60T 8/48
2019/0299962 A1* 10/2019 Leiber .................. B60T 17/226

OTHER PUBLICATIONS

International Search Report for PCT/EP2019/068746 dated Oct. 2, 2019.

* cited by examiner

METHOD AND CONTROL UNIT FOR OPERATING A HYDRAULIC BRAKING SYSTEM, BRAKING SYSTEM, AND MOTOR VEHICLE

The present invention relates to a method for operating a hydraulic braking system, which includes at least one actuatable actuator for generating a hydraulic brake pressure with the aid of a brake fluid in the braking system, the actuator including a pressure chamber for the brake fluid and a piston for decreasing or increasing a volume of the pressure chamber, and the actuator, for carrying out a braking process, being activated to increase the hydraulic pressure in the braking system from a starting pressure to a brake pressure by decreasing the volume of the pressure chamber and, for concluding the braking process, being activated to reduce the hydraulic pressure by increasing the volume of the pressure chamber to at least the starting pressure, a first leakage loss of the brake fluid in the braking system being ascertained as a function of the volume of the pressure chamber at the starting pressure at the beginning of the braking process and the volume of the pressure chamber at the starting pressure at the conclusion of the braking process.

The present invention furthermore relates to a control unit designed to carry out the above-described method.

The present invention additionally relates to a braking system including such a control unit, as well as to a motor vehicle including such a braking system.

BACKGROUND INFORMATION

Methods of the type mentioned above are available in the related art. In braking systems which are able to carry out a power brake application with the aid of an activatable actuator, regardless of a brake pedal actuation of a driver, for example, the braking system is monitored as to whether brake fluid leaves the braking system due to leakage and thereby impairs a subsequent braking process. In the long run, this leakage loss could mean that it is no longer possible to carry out a braking process. While in conventional braking systems, in which the driver himself or herself sets a hydraulic pressure by operating the brake pedal, the driver himself or herself, as a result of the counter force acting at the brake pedal, may himself or herself experience whether or not a loss of liquid is present, this is not possible in the case of power braking systems, so that a regular monitoring of the braking system is needed.

It has proven to be advantageous in the process to detect the volume in the pressure chamber of the actuator which is necessary for setting a hydraulic pressure. It is conventional to detect the volume of the pressure chamber immediately prior to and immediately after a braking process was carried out, and to compare the volume values to one another. For this purpose, in particular, the volume of the pressure chamber at the beginning of the braking process is detected, which is necessary to achieve a desired starting pressure, in particular, base pressure in the braking system, as well as the volume of the pressure chamber, which is set by displacing the piston during the conclusion of the braking process to restore the starting pressure. A first leakage loss is establishable as a function of a comparison of the detected volume values, which correspond to the positions of the piston in the pressure chamber, in particular, when the volume which is present during the conclusion of the braking process and displaced by the piston is greater than the volume which is displaced by the piston at the beginning of the braking process at the starting pressure, or when the remaining chamber volume of the pressure chamber during the conclusion of the braking process is lower than the chamber volume at the beginning of the braking process. In the process, the volume in the pressure chamber corresponds to the respective volume of the brake fluid displaced by the piston from the pressure chamber. In other words, the comparison is thus based on the brake fluid volume displaced by the piston. When a leakage loss is present, i.e., when brake fluid escapes from the braking system, the piston has to be displaced further to be able to set the same starting pressure in the braking system. The aforementioned monitoring uses this knowledge to advantage to ascertain the first leakage loss.

SUMMARY

A method according to the present invention may have the advantage that a more robust leakage monitoring is ensured, which enables a plausibility check of the above-described comparison of the hydraulic volumes. For this purpose, it is provided according to an example embodiment of the present invention that a second leakage loss of the braking system is continuously calculated while the braking process is carried out, and that the first leakage loss is compared to the second leakage loss for the plausibility check after the braking process has been carried out. Methods which continuously calculate the leakage loss while the braking process is carried out are already available. As a result of the comparison of the ascertained leakage losses, it is thus possible, in particular, to carry out a plausibility check of the first leakage loss and to check whether the former method for determining the first leakage loss was able to be carried out error-free. If the second leakage loss at least essentially corresponds to the first leakage loss, it is establishable that the method was carried out successfully, and the first leakage loss value may also be trusted. If, however, the second leakage loss considerably deviates from the first leakage loss, it is establishable that an error must be present, so that the method, for example, is carried out again and/or a warning message is output.

According to one preferred refinement of the present invention, the first leakage loss is determined as a function of the duration of the braking process. In the process, it is taken into consideration that the leakage loss may be greater over the duration of the braking process than in the case of a brief braking process, since more time is available during which the brake fluid is able to escape from the braking system due to the present or set brake pressure. By taking the duration of the braking process into consideration, it is thus possible to carry out the plausibility check more precisely and more reliably.

Furthermore, it is preferably provided that the second leakage loss is, in particular, only calculated in a phase with increasing hydraulic pressure. In this way, it is ensured that the second leakage loss is calculated unaltered. Optionally, the second leakage loss is also calculated in the case of decreasing hydraulic pressure, however preferably not up to the final pressure reduction. In the case of decreasing hydraulic pressure, the calculation is preferably concluded prior to the final pressure reduction, in particular, 200 to 300 ms prior to the final pressure reduction. In addition, the second leakage loss is optionally preferably also taken into consideration or calculated during the pressure-holding phase between increasing hydraulic pressure and decreasing hydraulic pressure.

Furthermore, it is preferably provided that an erroneous first leakage loss is recognized when the second leakage loss is lower than the first leakage loss. This indicates that the actually present leakage loss could not be correctly recognized by the ascertainment of the first leakage loss and taken into consideration.

In particular, the erroneous first leakage loss is only recognized when the difference between the first leakage loss and the second leakage loss exceeds a predefinable tolerance value. In this way, it is ensured that a premature warning message or the premature initiation of an emergency operation is prevented.

In particular, a warning message is output when a critical leakage loss is recognized. A critical leakage loss is understood to mean such a leakage loss which, in particular, exceeds a predefined limiting value. The warning message is preferably visually or acoustically output to the driver of the motor vehicle, so that he or she may respond and, for example, drive to a repair shop. As an alternative or in addition, a digital warning message is output to the control unit of the motor vehicle so that, in particular, as long as it is still possible to safely carry out a braking process, the warning message may initially only be stored and read out in a repair shop.

A control unit according to an example embodiment of the present invention is specifically configured to carry out the method according to the present invention. This results in the aforementioned advantages.

A braking system according to an example embodiment of the present invention includes the control unit according to the present invention. This also results in the aforementioned advantages.

The motor vehicle according to an example embodiment of the present invention includes by the control unit according to the present invention. This results in the aforementioned advantages.

Further advantages and preferred features and feature combinations result, in particular, from the disclosure herein.

The present invention is to be explained in greater detail hereafter based on the figures.

DETAILED DESCRIPTION OF EXAMPLE EMBODIMENTS

Figure 1:
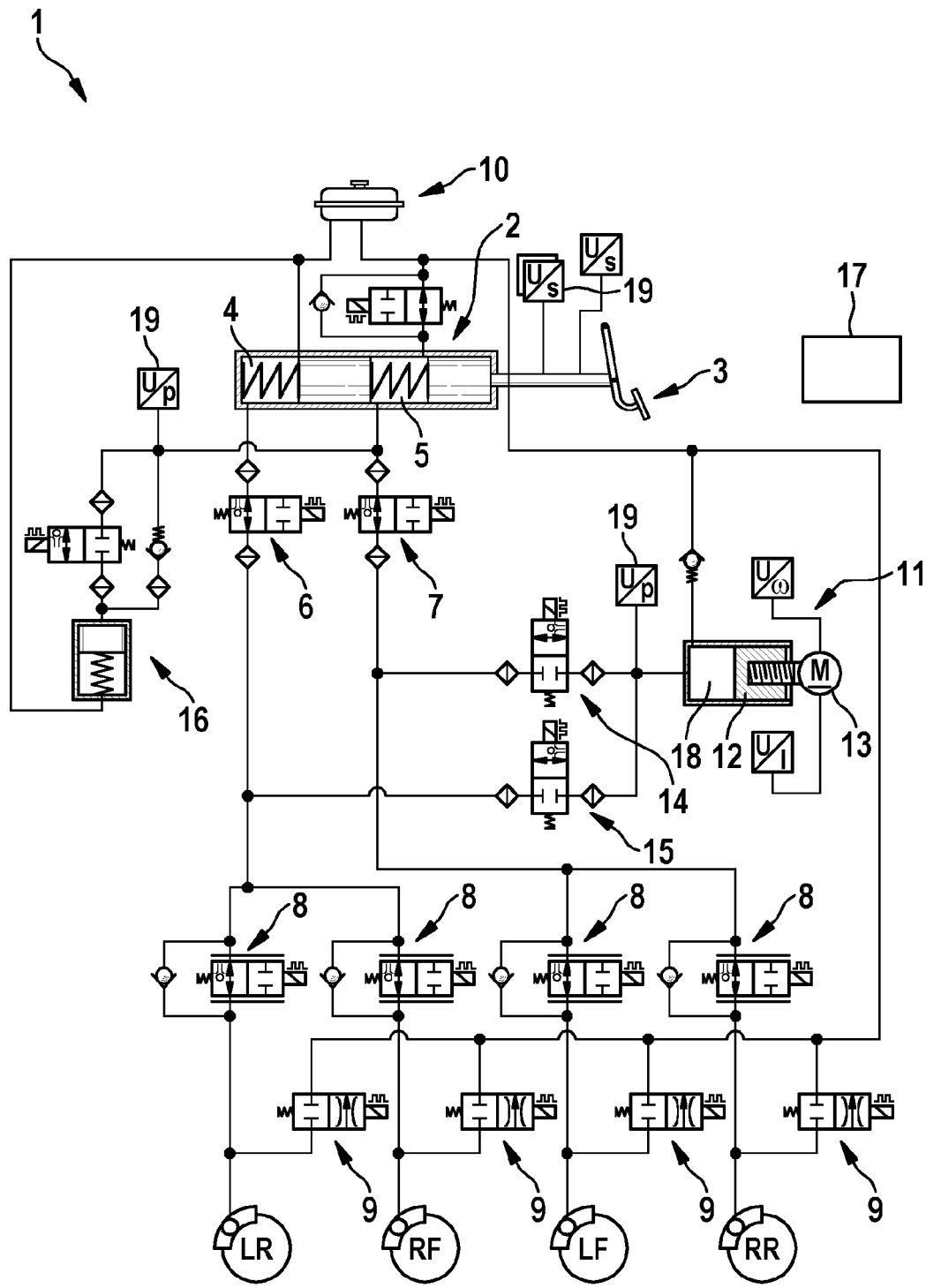
FIG. 1 shows an advantageous braking system of a motor vehicle.

FIG. 1 shows, in a simplified illustration, an advantageous braking system 1 of a motor vehicle which is not shown in greater detail here. Braking system 1 is designed as a hydraulically operating braking system and includes multiple wheel brakes LR, RF, LF and RR, which are each assigned to a wheel of the motor vehicle and are hydraulically actuatable. For this purpose, braking system 1 includes a master brake cylinder 2, which is actuatable by a driver of the motor vehicle with the aid of a brake pedal 3. In the present example, master brake cylinder 2 is designed as a tandem cylinder including two hydraulic chambers 4 and 5, a design of the braking system including a single master brake cylinder also being possible. Hydraulic chambers 4, 5 are each hydraulically connectable by a switching valve 6, 7 to a pair of wheel brakes LR, RF and LF, RR, respectively.

In the present example, wheel brakes LR and RF are connectable to switching valve 6, and wheel brakes LF and RR are connectable to switching valve 7, a particular volume control valve 8 being interconnected in each case between the particular switching valve 6, 7 and the particular wheel brake LR, RF, LF and RR, which regulates the hydraulic pressure in each case.

With the aid of a respective discharge valve 9, the particular wheel brake LR, RF, LF and RR is additionally hydraulically connectable to a tank 10 of braking system 1 storing the brake fluid. To reduce the hydraulic pressure at the particular wheel brake, the associated discharge valve 9 is actuated, for example, so that the hydraulic pressure drops until a desired braking force or a release of the particular wheel brake overall is achieved.

Braking system 1 moreover includes an activatable actuator 11, which may increase the hydraulic pressure in braking system 1 regardless of a brake pedal actuation. For this purpose, actuator 11 includes a displaceable piston 12, which delimits a pressure chamber 18 and is displaceable, in particular linearly shiftable, by an electric motor 13, to vary the hydraulic pressure in braking system 1 by varying the volume of pressure chamber 18. Actuator 11 is hydraulically or fluidically connected by two dedicated switching valves 14, 15 to the outlets of the particular switching valve 6 or 7, so that the actuator is connectable to the particular pairs of wheel brakes by valves 15, 14, as master brake cylinder 2 is connectable by switching valves 6, 7.

In an automated driving state, valves 6, 7 are preferably closed, and actuator 11 is activated to carry out a braking process as needed. Optionally, a braking process may also be carried out by actuator 11 as a function of a brake pedal actuation 3. Valves 6, 7 are also closed for this purpose, and optionally a braking force sensation simulator 16 is connected to master brake cylinder 2, which provides the driver at brake pedal 3 with haptic feedback corresponding to the braking force, so that the driving sensation is preserved for the driver in the customary manner, even though the braking force is actually generated by actuator 11 with the aid of an electric motor.

In particular when braking system 1 operates by power operation, i.e., by the activation of actuator 11, the monitoring of braking system 1 for a leakage loss is advantageous. For this purpose, braking system 1 advantageously includes a control unit 17, which carries out the method described hereafter.

Figure 2:
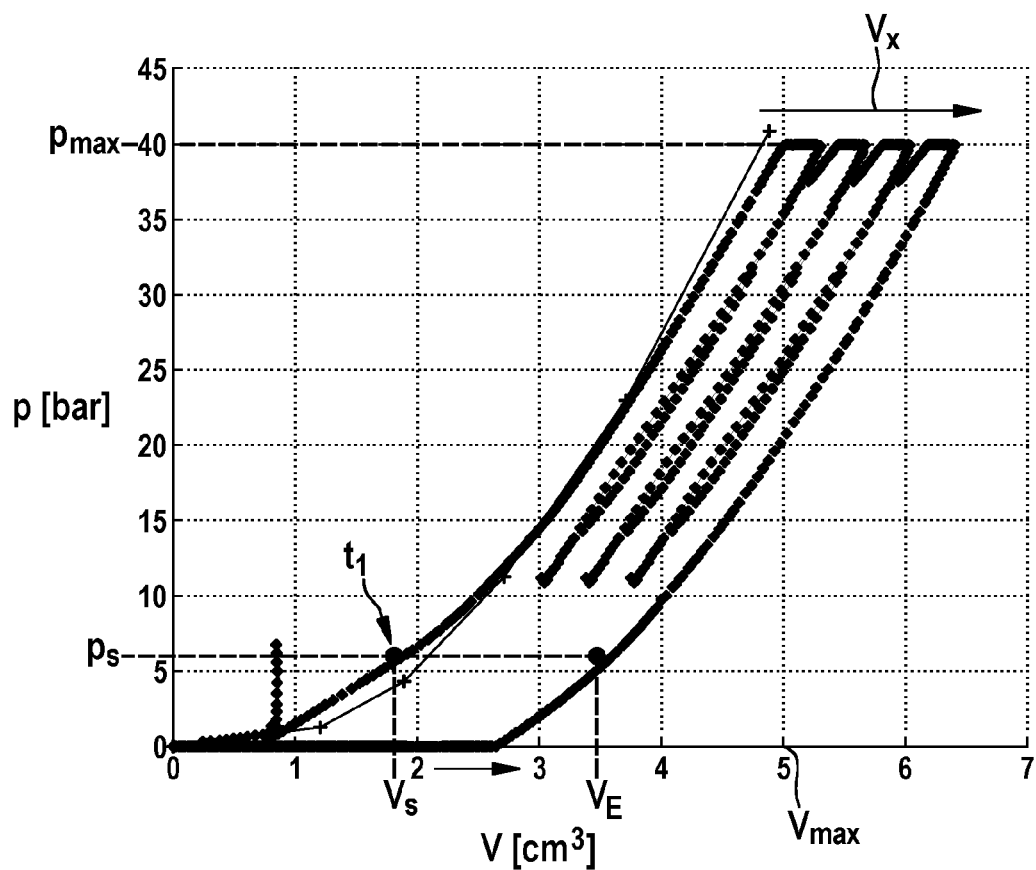
FIG. 2 shows a diagram to explain an advantageous method for operating the braking system.

To explain the method, FIG. 2, by way of example, shows hydraulic pressure p prevailing in braking system 1 plotted over the liquid volume displaced by piston 12, which corresponds to the volume or a volume change of pressure chamber 18.

The method begins at a point in time $t_1$, at which starting pressure $p_s$ prevailing in the system already has a value of $p_s$=6 bar. In the present example, this shall be understood to be purely by way of example. This starting pressure is present at a displaced volume of piston 12 or of actuator 11 of $V_s$, the position of piston 12 being regulated as a function of the monitored hydraulic pressure. For this purpose, preferably one or multiple pressure sensor(s) 19 is/are assigned in braking system 1. If actuator 11 is now activated, the displaced volume is increased according to the arrow until piston 12 comes to a halt at maximal displaced volume $V_{max}$. At this point in time, maximal pressure $P_{max}$ is reached. The maximal pressure or maximal volume does not have to be the maximal achievable pressure in terms of geometry or design or the maximal volume; in this case, it is rather the locally or instantaneously maximal achieved volume or the maximal achieved pressure of the particular braking process. To hold the pressure during an extended braking duration, it may become necessary due to a leakage loss to displace piston 12 further, and to reduce the volume of chamber 18, or to increase the displaced volume of piston 12, as shown by an arrow $V_x$. The further displacement of piston 12 depends on the braking duration and the extent of the leakage loss. If thereafter, upon conclusion of the braking process, the pressure is reduced again, for example in that piston 12 is retracted, the volume of pressure chamber 18 in braking system 1 changes accordingly, until it reaches a final value of $V_E$ at a point in time at which the starting pressure is reached. Due to leakage loss $V_x$, brake fluid is missing when starting pressure $p_s$ is reached and must be compensated for by actuator 11.

As a result of a comparison of volume $V_s$ at the beginning of the braking process to volume $V_E$ at the end of the braking process, a first leakage loss of braking system 1 is thus ascertainable.

Leakage loss $V_x$ is thus advantageously calculated as a function of the duration of the braking process as well as the difference between the volume at the beginning and at the end of the braking process. In addition, at the same time the leakage loss is continuously calculated during the braking process. For this purpose, the leakage loss is continuously calculated during the phases with increasing hydraulic pressure in braking system 1, and an overall leakage loss is determined. After the braking process has been concluded, when value $V_E$ is also known, the first leakage loss is compared to the second leakage loss to carry out a plausibility check of the first leakage loss. If it is found in the process that the second leakage loss is lower than the first leakage loss, it is inferred that the calculated first leakage loss is not trustworthy and thus cannot be decisive for the output of a warning message or the like. In this way, unnecessary warning messages and/or premature warning messages are avoided.

However, if it is recognized that the first leakage loss and the second leakage loss at least essentially correspond to one another, for example when the leakage losses do not deviate from one another beyond a predefinable tolerance value, a warning message is generated in the case of a critical leakage loss and is indicated, for example visually or acoustically, to the driver of the motor vehicle, so that he or she drives to a repair shop, for example to replenish brake fluid and/or have braking system 1 checked.

If it is recognized that the first leakage loss was erroneously calculated, the result is initially discarded, and the method is carried out again during the next braking process to confirm the leakage loss and/or to confirm the erroneously calculated first leakage loss. When it is established that the first leakage loss was correctly calculated, i.e., the result of the first measurement is confirmed by the subsequent measurement, and the leakage loss is assessed as being critical, a warning message is preferably output to the driver of the vehicle to draw his or her attention to the fact that a critical leakage loss is present. In this way, an overall robust method and a robust braking system are offered, whose probability of failure is reduced due to the identification of an erroneous monitoring.

What is claimed is:

1. A method for operating a hydraulic braking system, the hydraulic braking system including at least one actuatable actuator, wherein the actuator is (a) configured to generate a hydraulic brake pressure using a brake fluid in the braking system, (b) includes a pressure chamber for the brake fluid and a displaceable piston configured to decrease or increase a volume of the pressure chamber, (c) for carrying out a braking process, is activatable to increase the hydraulic pressure in the braking system from a starting pressure to a brake pressure by decreasing the volume, and (d) for concluding the braking process, is configured to reduce the hydraulic pressure to the starting pressure by increasing the volume, the method comprising:
   ascertaining a first leakage loss of the brake fluid in the braking system as a function of the volume of the pressure chamber at the starting pressure at the beginning of the braking process and the volume of the pressure chamber when the starting pressure is reached at the conclusion of the braking process;
   continuously calculating a second leakage loss of the brake fluid while the braking process is carried out; and
   comparing the first leakage loss to the second leakage loss for a plausibility check after the braking process has been carried out.

2. The method as recited in claim 1, wherein the first leakage loss is determined as a function of a duration of the braking process.

3. The method as recited in claim 1, wherein the second leakage loss is calculated only in phases with increasing hydraulic pressure.

4. The method as recited in claim 1, wherein an erroneous first leakage loss is recognized when the second leakage loss is lower than the first leakage loss.

5. The method as recited in claim 4, wherein the erroneous first leakage loss is recognized only when a difference between the first leakage loss and the second leakage loss exceeds a predefinable tolerance value.

6. The method as recited in claim 1, wherein a warning message is output when a critical leakage loss is recognized.

7. A control unit for operating a braking system for a motor vehicle, the braking system including at least one actuatable actuator, wherein the actuator is (a) configured to generate a hydraulic brake pressure using a brake fluid in the braking system, (b) includes a pressure chamber for the brake fluid and a displaceable piston configured to decrease or increase a volume of the pressure chamber, (c) for carrying out a braking process, is activatable to increase the hydraulic pressure in the braking system from a starting pressure to a brake pressure by decreasing the volume, and (d) for concluding the braking process, is configured to reduce the hydraulic pressure to the starting pressure by increasing the volume, the control unit being configured to:
   ascertain a first leakage loss of the brake fluid in the braking system as a function of the volume of the pressure chamber at the starting pressure at the beginning of the braking process and the volume of the pressure chamber when the starting pressure is reached at the conclusion of the braking process;
   continuously calculate a second leakage loss of the brake fluid while the braking process is carried out; and
   compare the first leakage loss to the second leakage loss for a plausibility check after the braking process has been carried out.

8. A braking system for a motor vehicle, comprising:
   at least one actuatable actuator, wherein the actuator is (a) configured to generate a hydraulic brake pressure using a brake fluid, (b) includes a pressure chamber for the brake fluid and a displaceable piston configured to decrease or increase a volume of the pressure chamber, (c) for carrying out a braking process, is activatable to increase the hydraulic pressure in the braking system from a starting pressure to a brake pressure by decreasing the volume, and (d) for concluding the braking process, is configured to reduce the hydraulic pressure to the starting pressure by increasing the volume;

one or multiple hydraulically actuatable wheel brakes; and a control unit configured to:

ascertain a first leakage loss of the brake fluid in the braking system as a function of the volume of the pressure chamber at the starting pressure at the beginning of the braking process and the volume of the pressure chamber when the starting pressure is reached at the conclusion of the braking process;

continuously calculate a second leakage loss of the brake fluid while the braking process is carried out; and compare the first leakage loss to the second leakage loss for a plausibility check after the braking process has been carried out.

9. A motor vehicle, comprising:

a braking system including:

at least one actuatable actuator, wherein the actuator is (a) configured to generate a hydraulic brake pressure using a brake fluid, (b) includes a pressure chamber for the brake fluid and a displaceable piston configured to decrease or increase a volume of the pressure chamber, (c) for carrying out a braking process, is activatable to increase the hydraulic pressure in the braking system from a starting pressure to a brake pressure by decreasing the volume, and (d) for concluding the braking process, is configured to reduce the hydraulic pressure to the starting pressure by increasing the volume;

one or multiple hydraulically actuatable wheel brakes; and a control unit configured to:

ascertain a first leakage loss of the brake fluid in the braking system as a function of the volume of the pressure chamber at the starting pressure at the beginning of the braking process and the volume of the pressure chamber when the starting pressure is reached at the conclusion of the braking process;

continuously calculate a second leakage loss of the brake fluid while the braking process is carried out; and compare the first leakage loss to the second leakage loss for a plausibility check after the braking process has been carried out.

\* \* \* \* \*